Dec. 18, 1956
J. M. WALTERS
2,774,110
METHOD OF EXTRUSION OF FURANE RESINS
Filed July 19, 1954
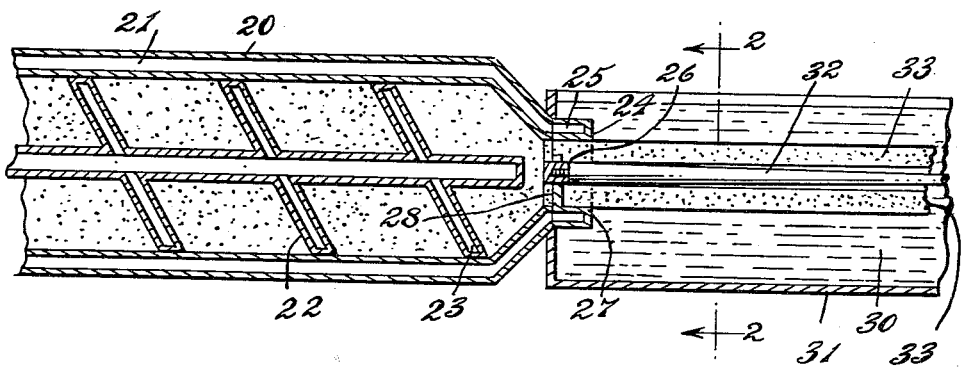
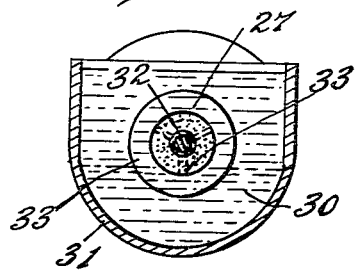
INVENTOR
Joseph M. Walters
BY
ATTORNEYS _United States Patent Office_

2,774,110
Patented Dec. 18, 1956

2,774,110
METHOD OF EXTRUSION OF FURANE RESINS

Joseph M. Walters, Allentown, Pa., assignor to Electro Chemical Engineering & Manufacturing Company, Emmaus, Pa., a corporation of Delaware Application July 19, 1954, Serial No. 444,319

1 Claim. (Cl. 18—55)

The present invention relates to processes of making improved extrusions from furane resins which are useful as pipes, tubes, rods, bars, sheets, angles and other shapes formed by extrusion, and which possess a high degree of resistance to acids, alkalis, solvents and heat. The invention also relates to the compositions themselves.

A purpose of the invention is to form furane resinous compositions into extrusions which are sound, accurately and uniformly formed, straight and free from cracks, so that the excellent mechanical properties of furane resins, especially when reenforced by fibrous fillers, such as superior shock resistance, hardness, toughness and chemical resistance can be made available in extruded form, whereas such resins have largely in the past only been obtainable in moldings, and the like.

A further purpose is to make the extrusion of furane resinous compositions controllable, notwithstanding that the thermosetting reaction is so highly exothermic and the sensitivity to catalysts is so great that extrusion has heretofore been possible only under very difficult and unsatisfactory conditions.

A further purpose is to create a furane resinous composition which can be extruded cold and will in effect consist of a slurry of solid particles in liquid resin, the resin being not advanced and having high wetting characteristics with respect to the solid ingredients. In this way the extrusion can be accomplished under moderate pressure without blocking of the die, but due to the exceptionally great formability of the composition the extruded product will maintain its shape and undergo curing by heat without substantial deformation.

A further purpose is to use a latent catalyst which is ineffective to advance the cure appreciably in 4 hours at 77° F., and to disperse the filler and catalyst in the resin at a temperature below 100° F., so that the final composition will extrude into useful products. The catalyst, however, is sufficiently active so that the final extrusion can be converted by heat to an insoluble, infusible state resistant to acids, alkalis and solvents.

A further purpose is to impart special properties by fillers so that the final extruded furane resinous composition can where desired have high thermal conductivity, or low thermal conductivity, high electrical conductivity, high electrical resistance, high abrasion resistance or other special properties which are of value in particular applications, while nevertheless retaining throughout the excellent resistances to acid, alkali and solvent of the resin.

A further purpose is to extrude a furane resinous mixture by first mixing at a temperature not in excess of 100° F. a furane resin having a viscosity between 15 and 5000 centipoises at 77° F., preferably between 50 and 1000 centipoises, and most desirably between 150 and 700 centipoises, and 1 to 15 percent on the weight of the resin of latent catalyst insufficiently active to cause the resin to advance in cure in 4 hours at 77° F. but sufficiently active to cause cure to take place at curing temperature and with 50 to 71 percent by volume of filler, preferably finely divided filler, including 0.5 to 23 percent by volume of fibrous filler, extruding the composition while cooling the same and maintaining the temperature below 120° F., the composition undergoing extrusion being in effect a slurry of solid particles in liquid resin of high wetting power.

A further purpose is to accept the extrusion beyond the extrusion die in an acceptance liquid having a specific gravity within ±10 percent and preferably within ±5 percent of the specific gravity of the extrusion, most desirably heavier than the extrusion so that the extrusion will have a slight tendency to float, and having no appreciable solvent attack on the extrusion, and then curing the extrusion desirably while supporting the same.

A further purpose is to employ an acceptance liquid having a viscosity below 300 centipoises.

A further purpose is to use an acid acceptance liquid which will have a tendency to encourage cure.

A further purpose is alternatively to maintain the temperature of the acceptance liquid at ambient temperature or at a temperature of between 100 to 150 degrees F. so as to begin the cure in the acceptance liquid.

A further purpose is to support the extrusion continuously in the acceptance liquid, in the case of tubing desirably inserting a mandril. In the case of solid structures such as rods, bars and shapes, the lower surface will desirably be mechanically supported in the acceptance liquid and during curing.

Further purposes appear in the specification and in the claim.

In the drawings I have chosen to illustrate to one only of the numerous embodiments in which my invention may appear, selecting the form shown from the standpoints of convenience in illustration, satisfactory operation and clear demonstration of the principles involved.

Figure 1 is a diagrammatic axial section of an extrusion device which is suitable for extrusion in accordance with the present invention.

Figure 2 is an enlarged section of Figure 1 on the line 2—2.

Furane resins are well known to possess a variety of excellent properties such as resistance to acids, alkalis, solvents and heat. They have, however, generally been employed in the form of moldings, castings, coatings or laminated impregnated layers because their characteristics make control of extrusion very difficult. The thermosetting reaction is highly exothermic and the furane resins are generally very sensitive to catalysts. The compositions which have been obtained in the past by mixing furane resins with fillers have possessed very poor cohesion so that the possibility of holding the shape of an extrusion has been limited due to the extreme dryness of compositions of low resin content and the unsuitability of compositions of high resin content for undergoing extrusion.

Efforts have been made in the past to extrude furane resins hot by mixing them with thermoplastic materials. For example Harvey, U. S. Patent No. 2,508,025, granted May 16, 1950, for Composition of Matter, mixes a furane resin with polyvinylbutyral, and with filler under elevated temperature conditions which advance the cure of the resin, so that if cooled it would approach a solid state at room temperature, and then extrude at elevated temperature. The mixture obtained prior to extrusion is not dense or coherent at ambient temperature and high resin contents are required to counteract dryness in the composition. Control is very difficult and there is danger that final cure will occur in the extruder. The final product is difficult to control accurately as to size and shape.

I have discovered that greatly improved control can be obtained and very much superior extrusions can be produced by using furane resins if the resin is initially of low viscosity so that it has high wetting power and imparts improved bonding properties to the filler, if the mixing of the resin, catalyst and filler is accomplished controllably at low temperatures with cooling so as not to advance the resin and not to reduce the bonding properties or wetting characteristics, if the extrusion is accomplished controllably at low temperature with cooling, if the resin content is kept very low and if the catalyst is sufficiently active so that it will not advance the cure in 4 hours at 77° F. but will cure at elevated temperature. Thus in accordance with the invention, the mixing of the ingredients is done cold with cooling, the extrusion is done cold with cooling, and therefore the mass, at the time it undergoes extrusion, instead of being a thick taffy-like material is a slurry of solid particles in liquid resin having high bonding properties, and therefore likely to retain its shape upon extrusion. The resulting product is dense, coherent and resistant to attack, so that the extrusion can be taken up in an acceptance liquid which tends to give support as later explained. The cracking encountered in prior attempted extrusions is not likely to occur because cure does not take place in the extruder and because the inherent flow characteristics and bonding characteristics of the composition favor density and coherence.

A very important aspect of the invention as already indicated is that the viscosity of the resin is not only initially low but remains low throughout the extrusion so that the resin is most effective in promoting flow, bonding and coherence. It is not sufficient merely to start with a resin of low viscosity, but it is also vital that you continue to maintain the resin of low viscosity throughout the operation until the extrusion leaves the extrusion die.

When reference has been made herein to mixing at a temperature below 100° F., it will be evident that this temperature has been set as a safe temperature which will not advance the resins under discussion. If, however, the particular resin has a higher safe mixing temperature, it will be understood that such higher mixing temperature may be employed without difficulty.

Fillers are of course important, and the filler content should be between 50 and 71 percent by volume, thus assuring that the resin content will be low. This tends to assure a firm body of the extrusion immediately after it leaves the die and the firmness of support is assisted by the acceptance liquid.

Up to the time that the extrusion leaves the die the catalyst, although present, has been inactive so that there has been no tendency of the resin to block the die by setting up, or to produce unfavorable flow conditions by increasing its viscosity. This of course necessitates that the extruder be cooled, as otherwise the reaction will be triggered.

The resinous composition of the invention is based upon a furane resin which is convertible to the insoluble infusible state by heat in the presence of a proper catalyst.

The resin should have a viscosity ranging from about 15 centipoises to about 5000, although it will preferably be in the range from 50 to 1000 and most desirably in the range from 150 to 700 centipoises. The resin viscosity can in some cases be reduced in viscosity by adding monomer, or by adding up to 10 percent on the weight of the resin of a nonpolymerizable solvent, such as methyl, ethyl or higher alcohol up to four carbon atoms in the straight or branched carbon chain.

The resin is of course initially a liquid which sets to a solid. The resin may be polyfurfuryl alcohol in an unadvanced condition. It may also be a polymerizable mixture of furfuryl alcohol and not over 15 percent by weight of furfural. Another suitable furane resin is a polymerizable mixture of furfuryl alcohol and formaldehyde in a molar ratio of 1 to 0.5 to 1 to 3 (Harvey U. S. Patents 2,343,972 and 2,343,973, granted March 14, 1944). Another suitable furane resin is a polymerizable mixture of ketone and a furfural in molar ratio of from 1 to 1 and 1 to 8, having alkyl groups, the ketone having at least two hydrogen atoms on an alpha carbon and having groups of the class of alkyl and ethylenic group each of carbon chain length not in excess of four, such as acetone methyl ethyl ketone, methyl isobutyl ketone, diacetone alcohol, mesityl oxide, diethyl ketone and diisobutyl ketone (see Harvey U. S. Patent 2,461,510, granted February 15, 1949).

A wide variety of such furane resins are available on the market, and any such commercial product may be used, as defined for example in any of the following patents: 2,345,966; 2,343,972; 2,343,973; 2,461,510; 2,516,317.

The latent catalyst used in the composition may be any one of a wide variety of organic acids, inorganic acids, acid salts or the like, which will not advance the resin in 4 hours at 77° F. but will cause a cure to take place at curing temperature.

The catalyst content should be between 1 and 15 percent of the quantity of resin by weight.

The activity and concentration of the catalyst are interrelated and are chosen so that sufficient time will be allowed at room temperature for mixing of the compound and extrusion without appreciable increase in the degree of condensation. On the other hand, the activity and concentration are again interrelated and should be sufficient to cause essentially complete conversion of the furane resin at curing temperature. The results can be achieved by a high concentration of the catalyst of low activity (weak catalyst) or a lower concentration of a more active catalyst.

The activity of the catalyst should not be such that the concentration required to cause substantially complete conversion to the insoluble infusible state is so high that the presence of the catalyst in the final product will reduce the chemical and water resistance. Thus the concentration of catalyst by weight in the final product should desirably not be greater than 10 percent and preferably not greater than 5 percent.

On the other hand, if the activity of the catalyst is very high, the concentration which will be used to prevent activity at room temperature must be so low that the catalyst will be impractical. Also, catalysts of very high activity cause local resinification before they are properly dispersed into the resinous composition.

The preferred latent catalysts of the character to be employed in the present invention are oxalic acid, sulfamic acid, phosphoric acid, maleic acid, maleic anhydride, sodium silico fluoride, zinc chloride, formic acid or phthalic acid.

In the case of liquid catalysts such as phosphoric acid, the catalyst is ordinarily added as concentrated acid. In the case of solid catalysts, such as zinc chloride, the catalyst is added as a solid. Any other weak acid may be used having an ionization constant of $1 \times 10^{-4}$ or higher. The ionization constant should not be above $1 \times 10^{-2}$. When reference is made to the ionization constant of an acid which is a liquid, it is intended to refer to the ionization constant and the concentrated acid, but if the acidic compound is a solid, it is intended to indicate the ionization constant of a solution of one formula weight per liter in water. The ionization constant is determined at 25° C.

The use of fillers is necessary to obtain a proper extrudable condition in the initial unconverted state, to obtain proper structural strength and body immediately after extrusion, and to secure the required high strength, dimensional stability and other properties in the final cured product. Furthermore, since fillers are relatively of low cost, they lessen the cost of the final product and thus broaden the potential use.

The choice of particular fillers depends upon the properties desired in the final cured product. Where excellent mechanical properties are required, a portion of the total filler should be fibrous material which reenforces the resinous composition, and increases the tensile, flexural and impact strengths. Glass fibers have good strength as well as chemical and heat resistance and are among the most suitable fillers. The glass fibers may be either in the form of chopped continuous filament, yarn or staple fiber. Fiber lengths may vary depending on the particular surface requirements from $\frac{1}{32}$ inch up to two inches.

Other suitable fibers are washed asbestos, rock wool, slag wool, nylon, Orlon (polyester), polyvinyl chloride or polyvinyl acetate, regenerated cellulose, paper or cloth cuttings, cotton, rayon, or the like.

The total quantity of resin should be kept low, and correspondingly the total quantity of filler should be high. The filler content should be between 50 and 71 percent by volume. Compositions having resin contents at about the lower limit (about 20 percent by weight) are of value from an economical standpoint and also because very high mechanical properties are obtainable with the high filler contents. Furthermore the final properties can depart markedly from that of furane resins because while furane resins are non-conductors of electricity and poor conductors of heat, the filler may impart good electrical conductivity and thermal conductivity where a high filler content is employed.

The quantity of fibrous fillers should be between 0.5 and 23 percent by volume, the remaining filler volume being taken by finely divided fillers. Generally fibrous fillers do not markedly increase the strength if used in quantities of less than 3 percent by weight. Usually the total quantity of fibrous filler should not exceed 35 percent by weight, as a higher content of fibrous filler causes difficulty in extrusion.

The optimum amount of fibrous filler is generally in the range of 5 to 25 percent by weight.

Of course the filler composition should have the desired acid resistance, moisture absorption, and hydrophilic or hydrophobic properties of the final product.

The non-fibrous portion of the filler is selected on the basis of the properties desired in the final product. All fillers should necessarily be inert to chemicals which the final product will come in contact with. Carbon flour such as ground petroleum coke is a satisfactory non-fibrous filler which is inert to most chemicals. When carbon flour is used as the non-fibrous filler, the resultant product has some electrical conductivity but a comparatively low thermal conductivity. Ground or air-floated anthracite coal gives properties similar to those of ground petroleum coke.

A high degree of thermal conductivity is obtained by using powdered graphite instead of carbon flour. Electrical insulating properties are obtained by using ground silica or ground mica as the non-fibrous filler. Silicon carbide or emery produces a product with high abrasion resistance.

Other suitable finely divided fillers are diatomaceous earth, clay, bentonite, talc, magnesia, alumina, dolomite, zinc oxide, barium sulphate, sand, pumice, mica dust, powdered glass, powdered chromite, iron oxide, powdered metal, wood flour, slate dust and various pigments.

The particle size of the non-fibrous fillers is selected to give proper consistency in the initial unconverted stage. The distribution of particle size is not critical. Generally the non-fibrous filler should pass a 20 mesh per linear inch screen and about 50 percent should pass a 200 mesh per linear inch screen. It is preferred to have all non-fibrous filler pass a 60 mesh per linear inch screen.

The entire filler, 50 to 71 percent by volume, may be non-fibrous filler, but where fibrous filler is present the non-fibrous filler should preferably be in the range between 27 and 70.5 percent by volume. Usually the non-fibrous filler when it is the only filler will be in the range between 65 and 80 percent by weight and when fibrous filler is present it will be in the range between 35 and 64 percent by weight.

The properties of the final extrusion and the control during extrusion are greatly influenced by the procedure used in dispersion of the components of the initially unconverted resinous compound. It is necessary to distribute the catalyst, resin and fillers uniformly throughout the composition. This dispersion must be accomplished without building up sufficient heat to advance the condensation of the resin appreciably. It is quite important that the mass during mixing should not rise above a temperature of 100° F., it being understood that this temperature is set as a safe temperature which is not likely to advance the particular resin, and that where a higher safe temperature is permissible for the particular resin, such higher safe temperature may be used. This is best accomplished by mixing on water cooled differential speed rolls which assure that a low temperature is maintained. It should be emphasized that the purposes of the present invention will be defeated entirely if mixing is carried out at elevated temperature above 100° F.

The extrusion of the resinous compound is likewise carried out under controlled low temperature conditions. Mechanical work is done on the composition during extrusion, and unless the heat thus developed is removed, the strongly exothermic reaction will cause the resin to thermoset in the extruder.

The extrusion cylinder and the screw or other force applying means should be cooled so that the temperature in the mass not immediately at the orifice is maintained below 100° F. In a small localized area immediately behind the orifice of the die, the temperature may rise to 120° F., but should not be permitted to rise higher than that. The extrusion rate is not important and it is not necessary to use any special extrusion lubricant.

Figures 1 and 2 illustrate diagrammatically a cylinder 20 having internal cooling passages 21 and provided with a cooperating internal extrusion screw 22 having internal cooling passages 23.

A die 24 at the forward end desirably having internal cooling passages 25 which communicate with those on the cylinder has an internal die element 26 and an external die element 27 connected by spiders 28. This may be regarded as any conventional screw type extruding machine having the desired cross section on the die.

The extruded product must not be cured too rapidly or blistering, cracking, and internal stresses will result. Accordingly, the extrusion should not be cured immediately after it leaves the die. The compositions of the invention are stiff enough so that simple shapes such as flat sheets and bars of adequate cross section may simply be picked up on a belt having the same contour as the lower part of the object being formed and left on the belt supported by it until the resin is converted sufficiently so that the product can be handled. Generally it is more convenient to remove the product to another surface for support before the heat treatment for curing it started.

When complex shapes such as pipes, tubes, angles, thin rods, and special shapes are being extruded, there is more danger of deformation.

Very much superior results are now obtained by extruding into an acceptance liquid which has a specific gravity approximating that of the resinous compositions, suitably ± 10 percent, and preferably ± 5 percent. The acceptance liquid is most desirably slightly higher in specific gravity than the resinous composition so that there will be a slight tendency of the extrusion to float.

In Figure 1, I show an acceptance bath 30 in a tank 31 beyond the die, in this case set up for receiving a tube. A mandril 32 in line with the interior of the tube 33 and desirably smaller is positioned to receive, guide and support the upper portion of the tube by engaging the interior. When in the acceptance liquid the extrusion has substantially no tendency to deform especially when supported as already described.

The acceptance liquid should not have any appreciable solvent effect on the unconverted resinous composition and it should not attack or penetrate to an appreciable extent. The composition of the present invention tends to produce a material which is resistant to penetration and attack and therefore favors the use of an acceptance liquid.

The viscosity of the acceptance liquid should be low enough so that resistance to flow of the extrusion does not cause deformation. Most desirably the viscosity of the acceptance liquid should be about 20 to 25 centipoises at 75° F., although very good results can be obtained with baths of viscosities up to 75 centipoises. Viscosities above 300 centipoises in the acceptance bath are definitely disadvantageous.

It is desirable that the acceptance liquid have a slight catalytic effect upon the resin as this will tend to convert a layer of resin at the surface and decrease any tendency of the liquid to penetrate the extrusion. The catalytic effect, however, should not be so great as to rapidly convert a thick layer at the surface, since this will cause blistering and develop internal stresses.

Good results have been obtained using zinc chloride solution in water having a viscosity of 20 to 25 centipoises at 75° F., and as an alternative orthophosphoric acid solution in water having a similar viscosity. A wide variety of weakly acidic water solutions can be used, including solutions of any of the latent catalysts referred to above which dissolve in water to the extent required to give the desired specific gravity.

The bath should be long enough or the time interval between forming of different extrusions great enough so that the extruded product can be left in the acceptance bath until the conversion of the resin has advanced sufficiently so that the product can be handled without deformation. In many cases the bath temperature is maintained at ambient temperature and the extrusions removed immediately from the bath and placed on suitable forms for support. In the case of tubing, the mandril support will desirably be removed with the extrusion as well as the support beneath the tube. If, however, it is desired to obtain full advantage of skin curing the temperature of the acceptance bath should be maintained in the range between 100 and 150° F.

In the case of many shapes, such as rods, bars, plates, and the like, the acceptance liquid provides sufficient support and it is not necessary to provide any mechanical support until the extrusion is removed from the acceptance liquid for curing. In the case, however, of pipes and tubes it is desirable to provide an interior guiding mandril in the acceptance liquid although this mandril need not conform closely to internal bore of the tubular shape.

After removal from the acceptance bath to the curing oven or autoclave, the extrusions are heated until conversion to the insoluble, infusible state is substantially complete. Since the condensation of furane resins is exothermic, care must be taken that the reaction does not proceed so rapidly as to cause blisters. The initial temperature at which the reaction is started should be high enough to maintain the reaction at a slow rate, but not high enough to permit the reaction to get out of control, as well known in the art. After the reaction had proceeded at a relatively low rate to the point where a large proportion of the exothermic heat has been dissipated, the temperature may then be raised to a higher level to complete the condensation to the final cured state. Usually two such steps in temperature are sufficient to completely cure the product, without blistering or cracking, although three or more steps may be used if desired.

The temperature and time allowed for each step of the cure will depend upon the activity and concentration of the catalyst, the character of the resin and the resin concentration. Generally the first stage of curing is carried on at 100 to 150° F. for from 4 to 24 hours. The final cure is accomplished at a temperature of 250 to 275° F. or higher for from 2 to 12 hours. Steam may permissibly be present at pressures up to 100 p. s. i. g.

During curing the extrusions are desirably supported as already explained. In some cases it is desirable to allow the extrusion to dry before curing for approximately one day at ambient temperature. In some cases also the excess of the chemical from the acceptance liquid is washed off before drying.

*Example 1*

277 parts by weight of a furane resin consisting of polyfurfuryl alcohol having a viscosity of 150 centipoises is mixed with 602 parts by weight of carbon flour, 100 parts by weight of one-half inch glass fibers and 21 parts by weight of sulfamic acids. The carbon flour represents 53 percent by volume and the glass fiber represents 7 percent by volume. The mass is thoroughly dispersed on water cooled mixing rolls maintaining a temperature below 100° F. and then extruded in accordance with the invention to a round tube into an acceptance liquid containing 55 percent by weight of zinc chloride in water. The tube is received in the acceptance liquid on an undersized mandril and then removed to a half round lower supporting form, the same size as the tube.

The tube is removed immediately from the acceptance liquid and cured for 24 hours at 130° F. and then for 6 hours at 275° F. The final extrusion is hard and strong, unaffected by non-oxidizing mineral acids such as sulphuric and hydrochloric, and very resistant to alkalis and solvents.

*Example 2*

286 parts by weight of the condensation product of furfuryl alcohol and formaldehyde in the molar ratio of 1 to 0.6 having a viscosity of about 700 centipoises are mixed with 214 parts by weight of short fiber acid-washed asbestos, 470 parts by weight of carbon flour and 30 parts by weight of oxalic acid. The dispersion is carried on on water-cooled rolls maintaining the compound at a temperature of below 100° F. and then the mass is extruded into a zinc chloride bath as described in Example 1 following the procedure of the invention to form a round bar. The bar was immediately removed from the bath on its support and cured for 24 hours at 130° F. and then for 6 hours at 275° F. The properties were similar to those described in connection with Example 1.

*Example 3*

200 parts by weight of furfuryl alcohol resin having a viscosity of 150 centipoises is mixed with 785 parts by weight of powdered graphite and 15 parts by weight of sulfamic acid. The mixing and extrusion were carried out under the precautions referred to above, extruding into a zinc chloride bath as in Example 1. The extrusion was supported and cured for 24 hours at 150° F. and then for 12 hours at 275° F.

The extrusion according to Example 3 has a much higher coefficient of thermal conductivity than the product of Examples 1 and 2, and has high resistance to acids, alkalis and solvents.

The procedure in accordance with the present invention offers a number of distinct advantages over prior art practice. Very high quality materials can be obtained with lower resin contents. Thus in prior art practice resin contents of 50 percent by weight or higher are likely to be used, while in the case of the present invention resin contents as low as 20 or 30 percent by weight may be used.

The present invention makes it possible to make very elongated shapes of high uniformity which could not be produced in furane resins by prior practice. It is also possible to produce at much higher speeds than under prior procedure.

The process of the invention likewise gives better strength, better over-all surface conditions, and moderately good tolerances.

By using low resin contents improved properties such as high heat conductivity can be obtained since higher proportions of heat conductive fillers may be used.

In view of my invention and disclosure variations and modifications to meet individual whim or particular need will doubtless become evident to others skilled in the art, to obtain all or part of the benefits of my invention without copying the process and composition shown, and I, therefore, claim all such insofar as they fall within the reasonable spirit and scope of my claim.

Having thus described my invention, what I claim as new and desire to secure by Letters Patent is:

The process of extruding a furane resinous composition, which comprises mixing at a temperature consistently maintained below 100° F. (a) a furane resin having a viscosity between 15 and 5000 centipoises when measured at 77° F. and selected from the class consisting of polyfurfuryl alcohol, polymerizable mixtures of furfuryl alcohol and not more than 15 percent by weight of furfural, polymerizable mixtures of furfuryl alcohol and formaldehyde in molar ratios of between 1 to 0.5 and 1 to 3, and polymerizable mixtures of ketone and furfural in molar ratios of between 1 to 1 and 1 to 8, the ketone having at least two hydrogen atoms on an alpha carbon and having groups of the class of alkyl and ethylenic groups each of carbon chain length not in excess of four, with (b) between 1 and 15 percent on the weight of the resin of a latent catalyst insufficient in activity to cause the resin to set in 4 hours at 77° F. and sufficient in activity to cause the resin to set at curing temperature, and with (c) from 50 to 71 percent by volume of filler, extruding the composition which has the form of slurry of solid particles in liquid resin through a die while cooling the composition and maintaining the temperature below 120° F., accepting the extrusion beyond the die in an acid liquid which is within ±10 percent of the specific gravity of the extrusion and free from soluble attack on the extrusion, the extrusion remaining as a solid in the extruded form in the acceptance liquid and the acceptance liquid serving to reduce the forces tending to distort the solid extrusion, and curing the extrusion thus formed at elevated temperature.

References Cited in the file of this patent
UNITED STATES PATENTS

| | | |
|---|---|---|
| 1,370,800 | Egerton | Mar. 8, 1921 |
| 2,331,572 | Scherer | Oct. 12, 1943 |
| 2,471,600 | Adams et al. | May 31, 1949 |
| 2,537,970 | Fields | Jan. 16, 1951 |